July 20, 1965     F. T. OGLE ETAL     3,196,189

METHOD OF CONTROLLING A DEHYDROGENATION PROCESS

Filed April 2, 1962

INVENTORS
F. T. OGLE
E. K. CLARDY
E. D. TOLIN

BY

*Young + Quigg*

ATTORNEYS

United States Patent Office 3,196,189
Patented July 20, 1965

3,196,189
METHOD OF CONTROLLING A DEHYDRO-
GENATION PROCESS
Frank T. Ogle, Ernest D. Tolin, and Edwin K. Clardy,
Bartlesville, Okla., assignors to Phillips Petroleum
Company, a corporation of Delaware
Filed Apr. 2, 1962, Ser. No. 184,077
6 Claims. (Cl. 260—683.3)

This invention relates to an improved method of and apparatus for controlling a process. In one specific aspect, this invention relates to an improved method of and apparatus for manipulating two input process variables in response to a measured determination, one of said manipulated process variables having a restricted operating range. In another specific aspect, this invention relates to an improved method of and apparatus for controlling a process wherein normal butane is dehydrogenated to produce butadiene.

It is conventional to manipulate one or more process variables in response to a process measurement. For example, in the production of butadiene from the dehydrogenation of butylenes and butylenes from the dehydrogenation of n-butane, the effluent of the dehydrogenation zone can be analyzed and the hydrocarbon feed rate and/or catalyst bed temperature manipulated in response to said analysis. Maximum dehydrogenation reactor throughput is normally preferred with the dehydrogenation reactor operating to produce a desired constant yeld. The ultimate capacity of the hydrogenation reactor is generally limited by the maximum allowable catalyst bed temperature. The dehydrogenation of the dehydrogenation reactor feed is a function of the feed rate, catalyst bed temperature, and the selectivity of the catalyst. It is desirable that a control method be employed which will permit the dehydrogenation reactor to operate at a maximum throughput and at a desired yield level without exceeding the maximum allowable catalyst bed temperature. The maximum catalyst bottom bed temperature is predetermined and is the maximum temperature permissible to effectively perform the desired dehydrogenation.

Another example, wherein it is desirable to manipulate at least two input process variables in response to the measurement of a process condition (controlled variable), is in the operation of a fractionator wherein the overhead product of a fractionator can be analyzed and the reboiler input rate and/or rate of reflux flow to the fractionator adjusted in response to said analysis. Assuming that the rate of flow of reflux to the fractionation zone can undergo only partial adjustment toward the desired level, it would then be desirable to be able to automatically adjust the reboiler heat input rate in response to said overhead product analysis, and to further adjust the reboiler input rate responsive to the partially adjusted reflux rate of flow.

Accordingly, an object of this invention is to provide an improved method of and apparatus for controlling a process.

Another object of this invention is to provide an improved method of and apparatus for manipulating at least two input process variables in response to a process measurement and/or determination.

Another object of this invention is to provide an improved method of and apparatus for controlling catalytic reaction processes.

Another object of this invention is to provide an improved method of and apparatus for controlling the dehydrogenation of n-butane and butylenes.

Other objects, advantages, and features of our invention will be readily apparent to those skilled in the art from the following description and the appended claims.

The inventive control method is better understood by referring to the method of controlling a specific process. Hereinafter, the inventive control method and apparatus therefor will be discussed as applied to the catalytic dehydrogenation of a butylene feed stream to produce butadiene. It is within the scope of this invention to apply the inventive control method to other processes.

The inventive method of control as applied to the catalytic dehydrogenation of a butylene feed stream comprises determining the operating efficiency as measured by the percent conversion, or percent yield, or catalytic selectivity of a catalytic dehydrogenation reaction step. The rate of butylene feed to the catalytic dehydrogenation reaction step is automatically adjusted, or manipulated, in response to a computed percent conversion, or percent yield, or catalytic selectivity. The temperature of the catalyst bed is automatically manipulated in response to the measured catalyst bed temperature and in response to the computed percent conversion, or percent yield, or catalyst selectivity so as to enforce maximum butylene throughput while operating at but not exceeding the maximum allowable catalyst bed temperature.

We have further discovered an improved method of and apparatus for controlling a catalytic reaction process wherein said method of control is based upon computing the rate of decrease of product yield, or conversion, or catalyst selectivity. We have also discovered an improved method of controlling a catalytic reaction process wherein said method of control is based upon determining the reaction profile throughout the catalyst bed.

As hereinafter employed in the specific butylene catalytic dehydrogenation process, the percent product yield is the ratio of the moles of butadiene in the dehydrogenation reactor effluent minus the moles of butadiene in the dehydrogenation reactor feed to the moles of butylenes in the reactor feed multiplied by a factor of 100. The percent conversion is the ratio of the moles of butylenes in the dehydrogenation reactor feed minus the moles of butylenes in the dehydrogenation reactor effluent to the moles of butylenes in the dehydrogenation reactor feed multiplied by a factor of 100. The catalyst selectivity is the ratio of the yield to the conversion.

Figure 1:
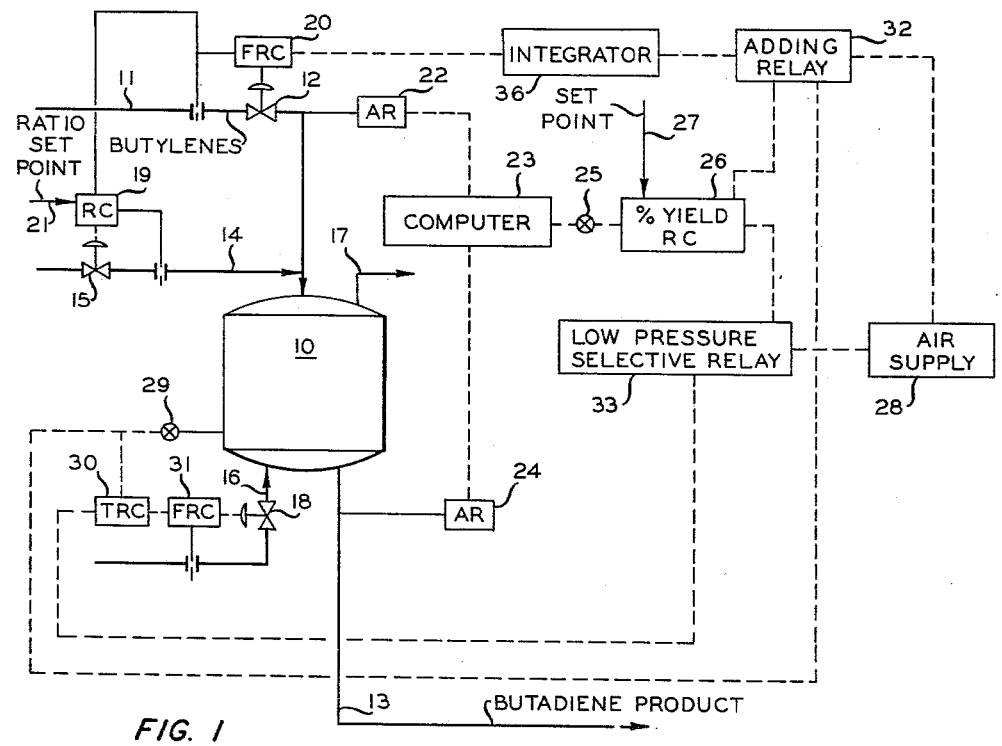
FIGURE 1 is a schematic representation of one embodiment of the inventive control method and apparatus therefor.

Referring to the drawings and to FIGURE 1 in particular, there is shown a dehydrogenation reactor 10. Disposed within dehydrogenation reactor 10 is a catalyst bed, said catalyst bed comprising a conventionally well-known olefin dehydrogenation catalyst such as a catalyst comprising about 93 percent $Fe_2O_3$, 5 percent $Cr_2O_3$, and 2 percent $K_2O$. A butylenes feed stream is passed via conduit means 11 and control valve means 12 to dehydrogenation reactor 10. The butylenes feed is mixed with an appropriate quantity of steam transmitted to conduit means 11 via conduit means 14 and control valve means 15. A butadiene product containing stream is withdrawn from dehydrogenation reactor 10 via conduit means 13.

The catalyst bed within vessel 10 is heated by passing a heating medium via conduit means 16 and control valve means 18 and withdrawing said heating means via conduit means 17. A suitable means of heating the catalyst bed comprises passing a fuel gas to burners within reactor 10, burning the gas to heat the catalyst contained in tubes, and withdrawing the combustion products via conduit means 17. Under such conditions, the flow-recorder-controller 31 could be replaced by a conventional pressure-recorder-controller.

The rate of flow of steam from conduit 14 to conduit 11 is controlled by a conventional flow-ratio-controller 19 opening or closing valve 15 in response to the flow of the hydrocarbon feed to conduit 11. Flow-ratio-controller 19 has a set point 21 representative of the desired steam to butylenes feed ratio. In the dehydrogenation of butylenes, a preferred ratio is about 12 moles of steam per mole of butylene feed.

The temperature of the dehydrogenation reactor 10 is preferably maintained in the range of 1100–1150° F., increasing from top to bottom of the catalyst bed, with a bottom bed temperature of 1130° F. preferred. The pressure maintained in dehydrogenation reactor 10 is preferably at atmospheric or subatmospheric. It is, of course, within the scope of the inventive method of control to employ other temperatures, pressures, and ratio of steam to hydrocarbon than herein illustrated.

The butylene feed flowing through conduit means 11 is analyzed by a conventional analyzer 22 such as a chromatographic analyzer, which includes a recorder-transmitter. Instrumentation of this type is manufactured by Perkin-Elmer Corporation and others. When employing the chromatographic analyzer-recorder-transmitter, a peak reading and holding device such as described in ISA Journal, 9, page 28, October 1958, will transmit the analog of the concentration of the component of interest to an analog computer 23. In the same manner, an analyzer-recorder-transmitter 24 can be utilized to analyze the product stream flowing through conduit 13 and the result thereof transmitted as in the case of analyzer-recorder 22 to computer 23. Although two analyzers have been herein illustrated, it is within the scope of this invention to employ only one analyzer-recorder-transmitter and to alternately pass samples of the feed and the product streams to said analyzer-recorder, transmitting the analyses to analog computer 23 alternately following such analysis.

When employing a chromatographic analyzer to analyze the feed and product streams, the output of the peak reader is an electrical signal in the range of 0 to 50 volts D.C. Computer 23 can, therefore, be a conventional small analog computer capable of solving for the percent yield, or percent conversion, or catalyst selectivity in response to input signals from analyzer-recorders 22 and 24, said input signals in the range of 0 to 50 volts D.C. For example, assume that analyzer 22 determines that the mol percent of butadiene in the feed is 5 and that the mol percent of butylenes in the feed is equal to 90. Further assume that analyzer 24 determines that the mol percent of butadiene in the product stream is equal to 80. Computer 23 must then be capable of substracting 5 from 80, dividing the result by 90, and multiplying the result of the division by a correction or expansion factor representative of the ratio of moles (total) of effluent to moles (total) of feed. An analog computer capable of performing this operation is model TR-10 manufactured by Electronic Associates, Long Branch, New Jersey. In order to simplify the explanation of the inventive method of control, the inventive method of control will be hereinafter described as based upon computer 23 determining the percent yield as previously defined.

Computer 23 transmits an electrical output signal representative of the percent yield of butadiene to an E.M.F.-to-pneumatic transducer 25 such as the Minneapolis-Honeywell 1–BA 20. Transducer 25 transmits an air signal in the range of 3–15 p.s.i., representative of the butadiene yield, to a yield-recorder-controller 26 such as a Foxboro model 5412 recorder-58P4 controller. Recorder-controller 26 has a set point 27 representative of the desired percent yield.

Recorder-controller 26 transmits to low pressure selective relay 33 a conventional signal which is a function of the difference between the set point yield and the measured yield, said signal also representative of a catalyst bottom bed temperature required to make the measured yield equal to the set point yield. A pneumatic pressure representative of the maximum allowable catalyst bottom bed temperature is transmitted from an air supply 28 to low pressure selective relay 33. The maximum allowable catalyst bottom bed temperature is the maximum temperature permissible for a given conversion level. Low pressure selective relay 33 is a conventional instrument capable of selecting and transmitting from said instrument the lower of two air pressure input signals received by said instrument. A suitable low pressure selective relay is the Taylor low pressure selector relay, model SK1359.

The air pressure signal received from air supply 28 is compared with the input signal received from recorder-controller 26 and the lower pneumatic signal representing the lower of the two temperatures is permitted to pass through low pressure selective relay 33 as the set point of conventional temperature-recorder-controller 30. The catalyst bottom bed temperature is determined by a conventional thermocouple and a signal representative of said bottom bed temperature is transmitted to an E.M.F.-to-pneumatic transmitter 29. Transmitter 29 transmits a pneumatic signal to a conventional temperature-recorder-controller 30.

The signal received by temperature-recorder-controller 30 from low pressure selective relay 33 cooperates with the measurement of the actual catalyst bottom bed temperature received from transducer 29 to continuously adjust the set point of the flow-recorder-controller 31, which in turn manipulates valve 18. The catalyst bottom bed temperature is thereby maintained at or below the maximum allowable temperature. It is within the scope of this invention to preheat the butylenes feed and to adjust the preheating of the feed so as to maintain the catalyst bottom bed temperature at or below the maximum allowable temperature. With reaction heat obtained by preheating the butylenes feed, the temperature of the catalyst bed decreases from top to bottom.

Recorder-controller 26 also transmits an error signal as a measurement input to a conventional adding relay 32, said error signal representative of the difference between set point 27 and the signal transmitted by transducer 25. Adding relay 32 is capable of totalizing three input variables and transmitting a signal representative of the totalization. An instrument capable of performing this function is Foxboro M56–4 computing relay which is described in Foxboro Technical Information bulletin 37–a–57 published by the Foxboro Co., Foxboro, Mass. An air pressure signal representative of the maximum allowable catalyst bottom bed temperature is also transmitted from air supply source 28 to adding relay 32 as a second input variable. A pneumatic signal representative of the measured catalyst bottom bed temperature is transmitted from transducer 29 to adding relay 32 as a third input variable. Adding relay 32 is operably connected so as to solve the following equation:

$$\text{Output} = A - C + B$$

where A is the input signal received from air supply 28, C is the input signal received from transducer 29, and B is the input signal received from recorder-controller 26. Thus, $A - C$ is the difference between the maximum allowable bottom bed temperature and the measured bottom bed temperature, and B is the difference between the desired or set point yield and the measured yield.

Adding relay 32 transmits an output signal responsive to the three input variables to an integrator 36. Integrator 36 transmits a signal to flow-recorder-controller 20 as said controller's set point. When the sum of the input variables to adding relay 32 is equal to zero, integrator 36 will continue to transmit a set point signal to flow-recorder-controller 20. Integrator 36 can be a pneumatic instrument as described in copending application Serial No. 78,692 by D. E. Lupfer, filed December 27, 1960, now U.S. Patent No. 3,104,810. Thus, the inventive method of control operates to adjust the butylenes feed rate through conduit 11 and the catalyst bottom bed temperature until the ouput of relay 32 is equal to zero. When this is achieved, the desired percent yield will be obtained with the maximum allowable catalyst bottom bed temperature. This will be the maximum possible throughput. By way of illustration; (1) if the measured yield is greater than the set point yield and if the measured bottom temperature is less than the maximum allowable bottom bed temperature, the rate of flow of feed will be increased to reduce the yield and the bottom bed temperature will be increased until the bottom bed temperature is at its maximum value; (2) if the measured yield is less than the set point yield and if the measured bottom bed temperature is greater than the maximum allowable bottom bed temperature, the rate of flow of feed will be decreased to increase the yield and the bottom bed temperature will be decreased until it is at its maximum value. Any combination of the difference between the measured bottom bed temperature and the maximum allowable bottom bed temperature and the differences between the set point yield and the measured yield will adjust the rate of feed flow and the bottom bed temperature until both differences are equal to zero.

Although the inventive control method has been described as particularly applied to the control of a butylene dehydrogenation process, it is within the scope of this invention to apply the control method to other dehydrogenation processes such as the dehydrogenation of n-butane to butylenes, the dehydrogenation of amylenes to isoprene, the dehydrogenation of 2-methyl-5-ethyl-pyridine to 2-methyl-5-vinylpyridine, and other processes wherein it is desired to manipulate two or more process variables in response to a process determination so as to produce a desired result. For example, in controlling a fractionation vessel, a signal representative of the concentration of a constituent in an overhead product stream can be passed to a controller having a set point representative of the desired concentration level. A signal representative of the required reflux flow rate is passed from said controller to a low pressure selective relay, said low pressure selective relay comparing said signal with the signal transmitted to said relay representative of the maximum allowable reflux flow rate. A signal representative of the lower reflux flow rate is passed from said relay to a means for manipulating the reflux flow rate. Said concentration controller also transmits an error signal representative of the difference between said set point and the concentration signal to an adding relay. A signal representative of the maximum allowable reflux flow rate is passed to said adding relay. A signal representative of a measured reflux flow rate is also passed to said adding relay. Said adding relay performs the functions previously described and transmits a signal to an integrator. The integrator transmits a signal as a set point to a second controller, said second controller manipulating the reboiler heat input rate.

The inventive method of control thus provides a method of manipulating at least two manipulatable process variables in response to a measured process variable and further adjusting one of said manipulatable process variables responsive to the allowable operating range or limit of the other of said manipulatable process variables. The inventive method of control further provides a method of manipulating at least two manipulatable process variables in response to a measured process variable and of further adjusting one of said manipulatable process variables responsive to the allowable operating range or limit of the other said manipulatable process variables and to a measurement of the other of said manipulatable process variables.

Figure 2:
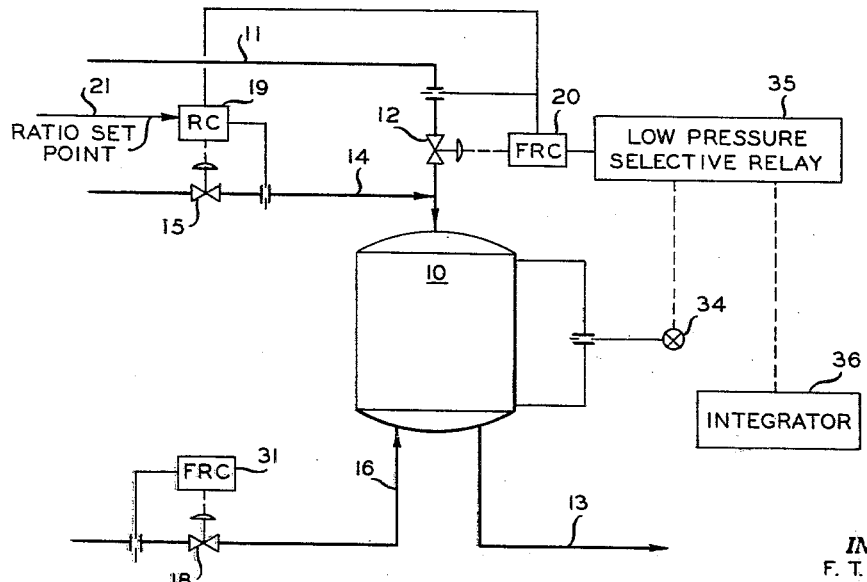
FIGURE 2 is a schematic representation of another embodiment of the inventive control method and apparatus therefor.

It is within the scope of this invention to further adjust the butylenes feed rate of flow responsive to the pressure drop across the catalyst bed. Referring to FIGURE 2, wherein only that portion of FIGURE 1 directly related to the further modification is illustrated, the pressure differential across the catalyst bed in dehydrogenation reactor 10 is noted. This differential pressure is transmitted by differential pressure transmitter 34 to a low pressure selective relay 35. Low pressure selective relay 35 functions in the manner heretofore described in connection with low pressure selective relay 33, continuously transmitting the signal received from integrator 36 to flow-recorder-controller 20 as heretofore described until the pressure drop across the catalyst bed exceeds the maximum allowable. At this point, low pressure selective relay 35 transmits a signal from differential pressure transmitter 34 to flow-recorder-controller 20, thereby reducing the butylenes feed rate of flow through conduit 11. The inventive method of control as illustrated by FIGURES 1 and 2 thus provides a method of manipulating at least two manipulatable process variables in response to a measured process variable and of further adjusting one of said manipulatable process variables responsive to the allowable operating range or limit of the other said manipulatable process variables, a measurement of the other of said manipulatable process variables, and the measurement of a third process variable.

Although the inventive method of control as specifically applied to the dehydrogenation process has been described in terms of a desired yield, or conversion, or catalyst selectivity at a fixed maximum catalyst temperature, it is within the scope of this invention to base the method of control upon a predetermined optimum yield curve. With the continued contacting of the catalyst with the feed stream, the percent yield decreases as the time increases. Therefore, it is within the scope of this invention to predetermine the optimum yield curve and insert a time cycle-operated yield cam as a set point 27 into yield-recorder-controller 26. In like manner, the operating limit of the catalyst bed temperature can be varied with time by placing a time cycle-operated pressure cam so as to vary the pressure transmitted by air supply source 28.

It is also within the scope of this invention to employ chromatographic analyzers to determine the composition of the flowing fluid at various levels of the catalyst bed (top, middle, bottom), thereby determining the percent yield profile curve through the catalyst bed. The slope or the mid point of the profile yield curve can then be determined by conventional means and this slope employed in the inventive control system. A signal representative of the measured slope is transmitted to a slope-recorder-controller. The slope-recorder-controller will compare this input signal with the set point representative of a desired slope and transmit a signal to adding relay 32 and a signal to low pressure selective relay 33 in the previously heretofore described manner. In like manner, temperature and pressure profiles of the catalyst bed within the dehydrogenation reactor 10 can be determined and the respective slopes employed to control the butylenes feed rate and the catalyst bed temperature in the heretofore described manner.

As will be evident to those skilled in the art, various modifications of this invention can be made, or followed, in the light of the foregoing disclosure and discussion without departing from the spirit or scope thereof.

We claim:

1. A method of controlling a process which comprises measuring at least a first process variable representative of the operating efficiency of said process, passing a first signal representative of said measurement to a first control zone, passing a second error signal responsive to said first signal from said first control zone to a second control zone, passing a third signal representative of a desired second process variable measurement from said first control zone to a third control zone responsive to said first signal, passing a fourth signal representative of the operating limit of a second process variable to said second and said third control zones, said third control zone capable of transmitting a fifth signal representative of one of two signals selected from the group consisting of said third and fourth signals received by said third control zone, passing said fifth signal from said third control zone to a means for manipulating said second process variable, thereby manipulating said second process variable responsive to said fifth signal, passing a sixth signal representative of a measurement of said second process variable to said second control zone, said second control zone solving the equation $$Output = A - B + C$$

where A is representative of said fourth signal, B is representative of said second error signal, and C is representative of said sixth signal, and passing a seventh signal representative of said output from said second control zone to a means for manipulating a third process variable, thereby manipulating said third process variable responsive to said second, fourth and sixth signals.

2. A method of controlling a process which comprises measuring at least a first process variable representative of the operating efficiency of said process, passing a first signal representative of said measurement to a first control zone, passing a second error signal responsive to said first signal from said first control zone to a second control zone, passing a third signal representative of a desired second process variable measurement from said first control zone to a third control zone in response to said first signal, passing a fourth signal representative of the operating limit of said second process variable to said second and third control zones, said third control zone capable of transmitting a fifth signal representative of a signal selected from the group consisting of said third and fourth signals received by said third control zone, passing said fifth signal from said third control zone to a means for manipulating said second process variable, thereby manipulating said second process variable responsive to said fifth signal, passing a sixth signal representative of a measurement of said second process variable to said second control zone, said second control zone solving the equation $$Output = A - C + B$$

where A is representative of said fourth signal, B is representative of said second error signal, and C is representative of said sixth signal, passing a seventh signal representative of said output from said second control zone to a fourth control zone, passing an eighth signal representative of a third process variable measurement to said fourth control zone, said fourth control zone capable of transmitting a ninth signal representative of a signal selected from the group consisting of said seventh and eighth signals received by said fourth control zone, and passing said ninth control signal from said fourth control zone to a means for manipulating a fourth process variable, thereby maninpulating said fourth process variable responsive to said ninth signal.

3. In a dehydrogenation process which comprises passing a light hydrocarbon feed stream to a dehydrogenation reaction zone containing a dehydrogenation catalyst, said light hydrocarbon feed selected from the group comprising normal butane, butylenes and amylenes and withdrawing from said dehydrogenation reaction zone an effluent hydrocarbon stream; a method of control which comprises measuring a property of said light hydrocarbon feed stream which is representative of the composition thereof, passing a first signal representative of said measurement to a computing zone, measuring a property of said effluent stream which is representative of the composition thereof, passing a second signal representative of said effluent stream measurement to said computing zone, passing a third signal representative of the effectiveness of said dehydrogenation reaction from said computing zone to a first control zone responsive to said first and second signals, passing a fourth error signal responsive to said third signal from said first control zone to a second control zone, passing a fifth signal representative of a required dehydrogenation reaction zone temperture from said first control zone to a third control zone responsive to said third signal, passing a sixth signal representative of a maximum allowable operating temperature in said dehydrogenation reaction zone to said second and said third control zones, said third control zone capable of transmitting a seventh signal representative of the minimum of said fifth and sixth signals received by said third control zone, passing said seventh signal from said third control zone to a means for manipulating a temperature of said dehydrogenation reaction zone, thereby manipulating said temperature responsive to said seventh signal, passing an eighth signal representative of a measured temperature of said dehydrogenation reaction zone to said second control zone, said second control zone solving the equation $$Output = A - C + B$$

where A is representative of said sixth signal, B is representative of said fourth signal, and C is representative of said eighth signal, passing a ninth signal representative of said output from said second control zone to means for manipulating the rate of flow of said light hydrocarbon feed to said dehydrogenation reaction zone, thereby manipulating said rate of flow of said light hydrocarbon responsive to said ninth signal.

4. The process of claim 3 wherein said third signal passed from said computing zone to said first control zone comprises a signal representative of the percent yield obtained in said dehydrogenation reaction zone.

5. In a dehydrogenation process which comprises passing a light hydrocarbon feed stream to a dehydrogenation reaction zone containing a dehydrogenation catalyst, said light hydrocarbon feed selected from a group comprising normal butane, butylenes and amylenes, and withdrawing from said dehydrogenation reaction zone an effluent hydrocarbon stream; the method of control which comprises measuring a property of said light hydrocarbon feed stream which is representative of the composition thereof, passing a first signal representative of said measurement to a computing zone, measuring a property of said effluent stream which is representative of the composition thereof, passing a second signal representative of said effluent stream measurement to said computing zone, passing a third signal representative of the effectiveness of said dehydrogenation reaction process from said computing zone to a first control zone responsive to said first and second signals, passing a fourth error signal from said first control zone to a second control zone responsive to said third signal, passing a fifth signal representative of a required dehydrogenation reaction zone temperature from said first control zone to a third control zone responsive to said third signal, passing a sixth signal representative of a maximum allowable temperature in said dehydrogenation reaction zone to said second and said third control zones, said third control zone capable of transmitting a seventh signal representative of the minimum of said fifth and sixth signals received by said third control zone, passing said seventh signal from said third control zone to a means for manipulating a temperature of said dehydrogenation reaction zone, thereby manipulating said temperature responsive to said seventh signal, passing an eighth signal representative of a temperature measurement of said dehydrogenation reaction zone to said second control zone, said second control zone solving the equation $$Output = A - C + B$$

where A is representative of said sixth signal, B is representative of said fourth signal, and C is representative of said eighth signal, passing a ninth signal representative of said output from said second control zone to a fourth control zone, passing a tenth signal representative of a pressure drop across said dehydrogenation reaction zone to said fourth control zone, said fourth control zone capable of transmitting an eleventh signal representative of the minimum of said ninth and tenth signals received by said fourth control zone, passing said eleventh signal from said fourth control zone to a means for manipulating the rate of flow of light hydrocarbon feed to said dehydrogenation reaction zone, thereby manipulating said rate of flow responsive to said eleventh signal.

6. The process of claim 5 wherein said third signal passed from said computing zone to said first control zone comprises a signal representative of the percent yield obtained in said dehydrogenation reaction zone.

References Cited by the Examiner
UNITED STATES PATENTS 2,908,734  10/59  Cottle _____ 260—683.15
3,050,469   8/62  Morgan et al. _____ 260—683.3

ALPHONSO D. SULLIVAN, *Primary Examiner.*